US006512934B2

(12) United States Patent
Ihara et al.

(10) Patent No.: US 6,512,934 B2
(45) **Date of Patent: *Jan. 28, 2003**

(54) ADAPTIVE ARRAY ANTENNA

(75) Inventors: Taisuke Ihara, Yokohama (JP); Ryo Yamaguchi, Yokohama (JP)

(73) Assignee: NTT Mobile Communications Network, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,734

(22) PCT Filed: Jun. 1, 1998

(86) PCT No.: PCT/JP98/02408

§ 371 (c)(1),
(2), (4) Date: Aug. 25, 1998

(87) PCT Pub. No.: WO98/56069

PCT Pub. Date: Dec. 10, 1998

(65) Prior Publication Data

US 2001/0044276 A1 Nov. 22, 2001

(30) Foreign Application Priority Data

Jun. 2, 1997 (JP) ........................................ 9-144221

(51) Int. Cl.$^{7}$ ........................................ H04Q 7/00

(52) U.S. Cl. ........................................ 455/562; 455/422

(58) Field of Search ........................................ 455/562, 270, 455/271, 272, 276.1, 278.1, 422, FOR 102; 342/359, 368, 373, 383, 371, 414; 343/758, 793, 794, 832, 878, 879, 882, 833–840, 757, 702

(56) References Cited

U.S. PATENT DOCUMENTS

| | | | | | |
|---|---|---|---|---|---|
| 3,273,144 A | | 9/1966 | Fishbein | | |
| 3,903,524 A | | 9/1975 | Giannini | | |
| 4,638,318 A | * | 1/1987 | Gutleber | ........ | 342/383 |
| 5,045,859 A | * | 9/1991 | Yetter | ........ | 342/414 |
| 5,493,306 A | * | 2/1996 | Rudish et al. | ........ | 342/371 |
| 5,548,813 A | | 8/1996 | Charas et al. | ........ | 455/562 |
| 5,861,844 A | * | 1/1999 | Gilmore et al. | ........ | 455/423 |
| 5,877,729 A | * | 3/1999 | Holloway et al. | ........ | 343/767 |
| 5,890,067 A | * | 3/1999 | Chang et al. | ........ | 455/562 |
| 5,893,033 A | * | 4/1999 | Keskitalo et al. | ........ | 455/562 |
| 5,907,816 A | * | 5/1999 | Newman et al. | ........ | 455/562 |
| 5,966,094 A | * | 10/1999 | Ward et al. | ........ | 342/373 |
| 5,969,689 A | * | 10/1999 | Martek et al. | ........ | 343/758 |
| 6,101,399 A | * | 8/2000 | Raleigh et al. | ........ | 455/561 |
| 6,167,286 A | * | 12/2000 | Ward et al. | ........ | 455/562 |

FOREIGN PATENT DOCUMENTS

| | | |
|---|---|---|
| EP | 0 715 478 | 6/1996 |
| JP | 8-32347 | 2/1996 |
| JP | 9-27714 | 1/1997 |
| JP | 10-174160 | 6/1998 |

* cited by examiner

*Primary Examiner*—Lester G. Kincaid
(74) *Attorney, Agent, or Firm*—Connolly Bove Lodge & Hutz LLP

(57) ABSTRACT

An adaptive array antenna for use in a base station according to the CDMA mobile communication system. A number of antenna elements greater than the number of elements (a reference number) which would be required when directional antenna elements each having a beam width which is the same as a sector angle are used to provide a service area having a sector angle which is narrower than the element beam width, or a number of antenna elements each having a beam width broader than the sector angle which is less than the reference number may be used to define a service area.

7 Claims, 6 Drawing Sheets

ADAPTIVE ARRAY ANTENNA

TECHNICAL FIELD

The invention relates to an array antenna for use in a base station of a mobile communication such as automobile telephone, cellular telephone or the like and comprising an array of a plurality of antenna elements to provide a service area defined by an angular range in a horizontal plane or a so-called sector area, and more particularly, to an adaptive array antenna unit having an adaptive processor which adaptively suppresses an interference wave connected thereto.

PRIOR ART

In the mobile communication such as automobile/cellular telephone or the like according to the cellular system, those base stations which are distantly spaced apart utilize identical frequencies in order to increase the subscriber capacity so that limited frequencies can be efficiently utilized. However, when frequencies are used repeatedly, there arises a problem of interference noises due identical frequencies. Another issue occurs that the subscriber capacity is degraded as the interference noises increase.

Conventional approach to suppress the interference noises has been the use of a directional antenna for the base station antenna. An antenna which exhibits the directivity in the horizontal plane is utilized, and techniques such as sectoring a cell or a beam tilting which varies the directivity in the vertical plane have heretofore been employed. These techniques achieve the effect of improving the reception SIR (signal wave/interference wave ratio) in that the use of a directional antenna for the base station antenna is effective to suppress interference waves from directions other than the direction of the antenna directivity.

In addition to these techniques, an investigation is recently being made to suppress interference noises by the use of an adaptive array antenna. An adaptive array antenna refers to the technique which employs a plurality of antennas (an array antenna) arranged so as to be spatially spaced apart to define adaptively a directivity having null beam (of zero sensitivity) in the direction of an interference wave and a narrow beam in the direction of a desired wave, thus suppressing the interference noise level. However, in the investigation of past adaptive array antennas, it is desired that the beam direction thus defined can be changed at will over a broad range, and accordingly, a non-directional (or whole directivity: omni-directivity) element is used for each of the antenna elements. An arrangement in which a directional antenna is used for individual elements which constitute together an array antenna to provide their radiant directivity is scarcely found. Even in the CDMA system, there has been no idea of employing an adaptive array antenna which uses directional antenna elements.

As mentioned previously, a sectoring technique is frequently employed in the cellular system, and a directional antenna which is adapted to the sectored configuration is required at this end. In a conventional system which does not employ an adaptive array antenna, an antenna of a base station has a directivity in a horizontal plane, a half power width (hereafter referred to as beam width) of which is equal to a sector width. Thus, an antenna having a beam width of 120° is normally used for a 120°-sector (or 3 sector) arrangement. In an investigation which deals with the application of a directional antenna to a prior art base station adaptive array antenna (see "Influences of antenna directivity in a mobile communication base station adaptive array antenna" by Ryo Yamaguchi and Yoshio Ebine, Academy of Communication Technical Report AP 96-131, 1997–01), it is reported that an antenna having a beam width broader than the sector angle is required to construct sectors since the angle over which interference waves can be rejected is narrower than the beam width of the antenna. The investigation disclosed in this literature relates to a mobile communication system which incorporates TDMA system as the radio access technique, and thus reveals an outcome of investigation obtained under a condition that there are a relatively few number of interference waves. Currently, there is no instance of investigating a relationship between the sector angle and the beam width under a condition that there are an increased number of interference waves as in the CDMA system.

Thus, the use of a directional antenna has little been taken up in the investigation of conventional adaptive array antennas, and accordingly, there has been little disclosure on how an optimum antenna can be constructed when an adaptive array antenna is to be used with a sector cell for which a directional antenna is used. In particular, it is the current status of the art that no antenna arrangement has been disclosed which can be used in an environment that a number of interference waves are oncoming from all directions as occurs in a system which incorporates the CDMA as the radio access technique.

It is an object of the invention to overcome such problem and to provide an optimum adaptive array antenna unit for a base station according to the CDMA mobile communication system.

DISCLOSURE OF THE INVENTION

According to a first aspect of the invention, in an adaptive array antenna unit for a base station of mobile communication in which CDMA system is employed as the radio access technique, a service area within a sector is defined by using antenna elements which constitute together an array antenna and each have a beam width within the horizontal plane which is narrower than the sector angle. In particular, the service area can be defined by a number of antenna elements greater than the number of antenna elements (referred to as reference number) which is required when the beam width within the horizontal plane of the antenna element is substantially equal to the sector angle.

According to a second aspect, an antenna having a beam width broader than the sector angle within the horizontal plane is employed as an element. In particular, the service area can be defined by a number of antenna elements which is reduced from the reference number of elements.

BEST MODES OF CARRYING OUT THE INVENTION

Embodiment 1

Before describing the embodiments of the invention, a result of a computer simulation for the directivity characteristic when a directional antenna is applied to an adaptive array antenna base station according to CDMA mobile communication system will be described. Specifically, an error rate characteristic of a received signal from a mobile station as the location of the mobile station, the directivity of each of antenna elements which constitute an array antenna and the number of antenna elements which constitute the array are changed is described, thereby indicating that an antenna arrangement (antenna directivity, the number of array elements) for a desired sector angle or the present invention can be obtained.

Figure 1:
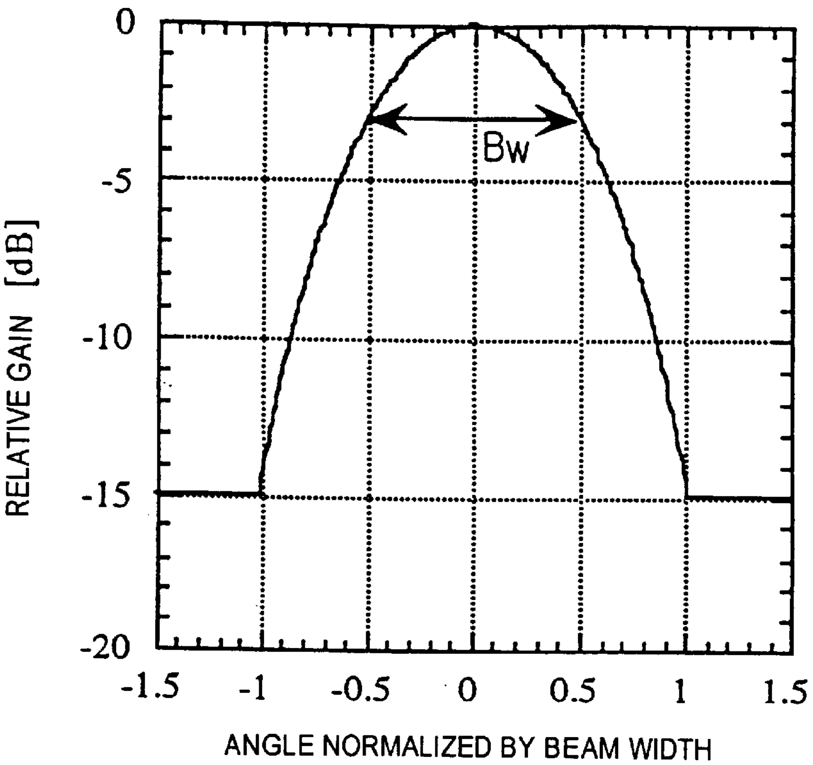
FIG. 1 is a diagram showing the directivity of an antenna which is used in a computer simulation.
Figure 2:
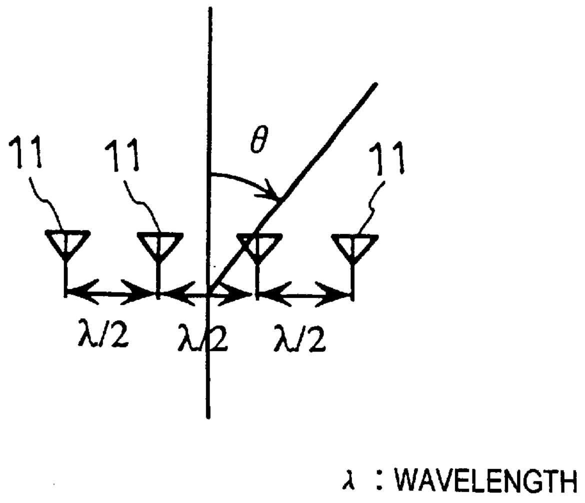
FIG. 2 shows the layout of array antenna elements or a four-element array antenna and a coordinate system.

The simulation has taken place in an environment that 36 mobile stations (users) are laid out within a cell, each being simultaneously engaged in communication using mutually different spread codes, so that a condition is achieved that there are a number of interference waves. Transmitting power from the mobile station is controlled so that a received power from respective mobile station is uniform among all the users. FIG. 1 shows the directivity in the horizontal plane of antenna elements used in the simulation. The abscissa indicates the angle as normalized in terms of beam width $B_w$ while the ordinate indicates the relative gain as normalized by the peak power. The peak gain is chosen so that the power radiated from the antenna remains constant if the beam width $B_w$ is changed, and the side lobe level is chosen to be 15 dB below the peak power. A plurality of antenna elements 11 are disposed on a line in the horizontal plane to provide a linear array as shown in FIG. 2, with the spacing between antenna elements to be a half wavelength spacing, and with the principal beam directed in a direction of $\theta=0°$ for all of antenna elements 11 which constitute the array antenna and directed perpendicular to the direction of array of the antenna elements 11 within the horizontal plane.

Figure 3:
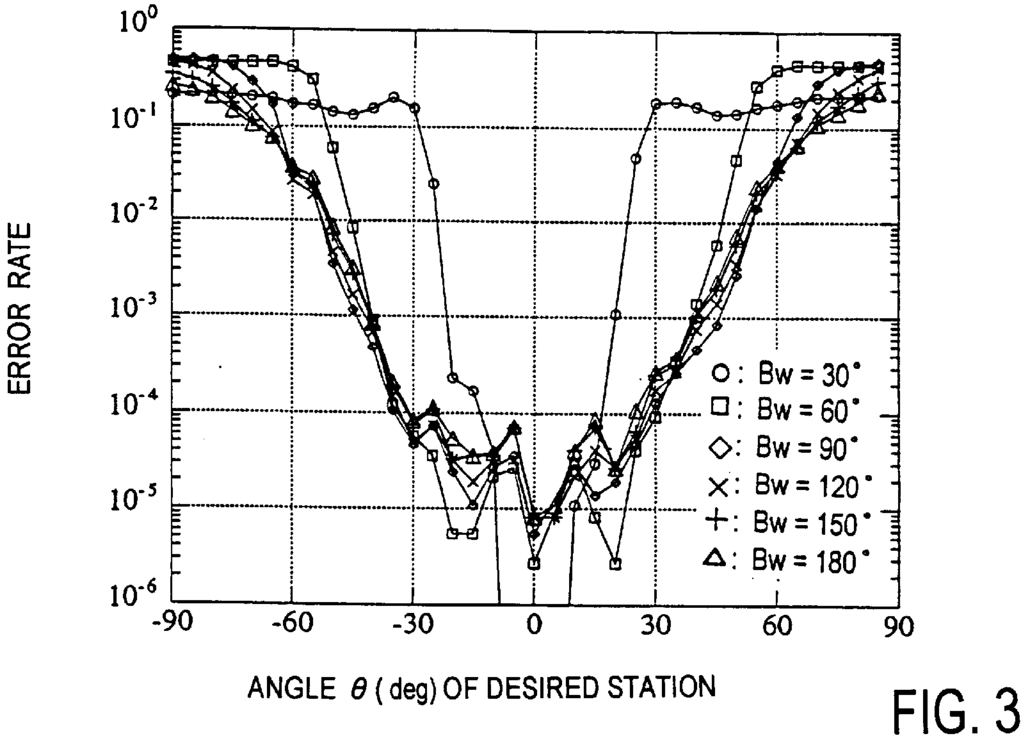
FIG. 3 is a diagram illustrating a result of a computer simulation for an error rate characteristic of a received signal as the angle of a desired station is changed with the beam width of an array antenna used as a parameter.

FIG. 3 illustrates an example of a result of calculation. This Figure illustrates the error rate characteristic depending on the location of the mobile station, the abscissa representing the angle of the mobile station as viewed from the base station antenna (with the frontal direction of the array antenna being 0°) while the ordinate represents the error rate. Because the transmitting power of the mobile station is controlled, the dependency on the location of the mobile station does not depend on the distance between the mobile station and the base station, thus requiring a consideration of only the angular dependency. Respective curves shown illustrate the characteristics when the beam width $B_w$ of the antenna element 11 is changed in increment of 30° from 30° to 180°, all the curves been shown for four-element array antennas. Assuming that a sector angle is represented by an angular region in which the error rate as determined from this Figure is equal to or less than $10^{-3}$, the sector angle will be about 40° when the beam width $B_w$ is equal to 30°, and in a range of beam width $B_w$ of 60°~180°, the sector angle is substantially equal to 90° and remains constant, indicating a result that there is no proportionality between the element beam width and the sector angle. An adaptive array antenna exhibits an excellent performance that it forms a null beam toward an interfering station (wave) and directs its beam peak toward a desired station (wave), but when a directional antenna element is used, the beam tracking capability is degraded when the direction of the mobile station (or the direction of the desired wave) shifts toward the end of the beam width. This is attributable to the fact that the directivity of the antenna element 11 has its gain inherently reduced toward the beam end. It then follows that the beam width of the antenna element can be increased in order to increase the sector angle. However, since the interference waves are oncoming from all directions in the CDMA system, as the beam width of the antenna element is increased, this result in receiving much more interference waves to degrade the reception SIR, also degrading the error rate characteristic. For these reasons, there results a consequence that the sector angle can not be increased if the beam width of the antenna element is increased.

Figure 4:
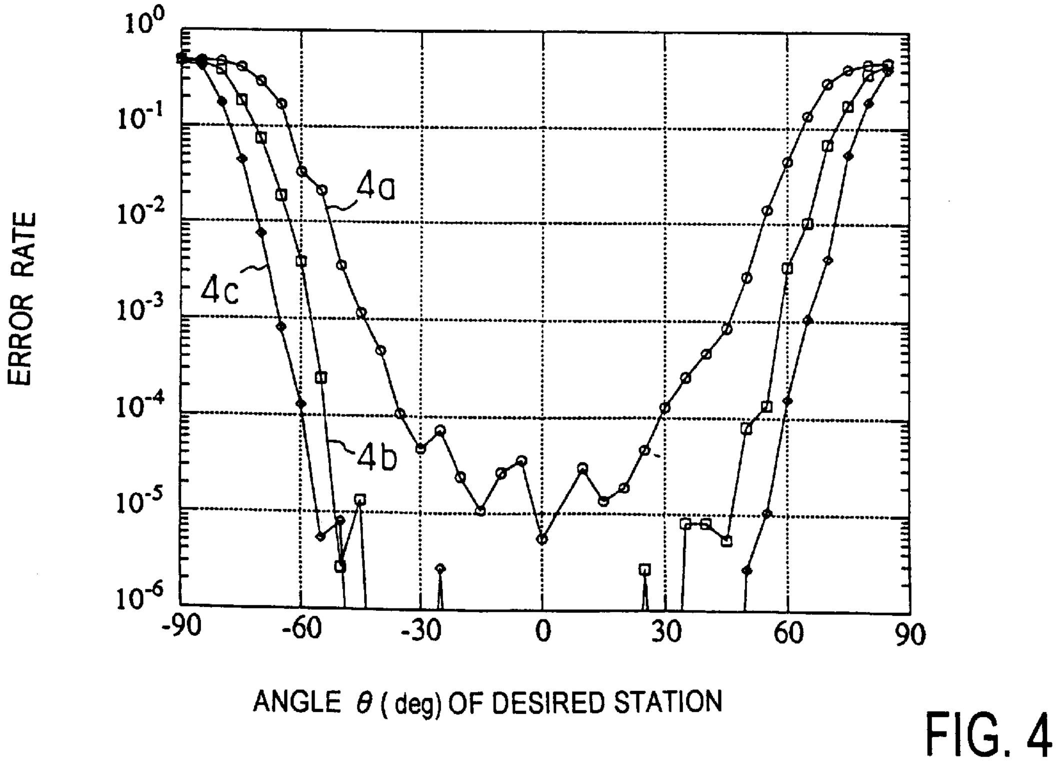
FIG. 4 is a diagram showing a result of a computer simulation for an error rate characteristic of a received signal as the angle of a desired station is changed with the number of elements in the array antenna used as a parameter.

FIG. 4 illustrates the error rate characteristic depending on the location of the mobile station in the similar manner as in FIG. 3, but in this instance, curves 4*a*, 4*b* and 4*c* show the characteristics when the number of antenna elements which constitute the array (hereafter referred to as the number of array elements) is chosen to be equal to 4, 6 and 8, respectively. The beam width of the antenna element is equal to 120°. It will be seen from this Figure that as the number of array elements is increased, the sector angle can be increased if the elements having the same beam width are employed.

When the number of elements which constitute an adaptive array antenna is equal to N, the number of null beams which are formed in the directions of interference waves will be equal to N−1 (this is referred to as the freedom of the array antenna). Consequently, as the number of array elements increases, the number of null beams formed increases, thus improving the reception SIR and increasing the sector angle. In the present simulation, a condition is employed that the number of interference waves is greater than the number of array elements, and accordingly, as the number of array elements is increased, the reception SIR is improved in a proportional manner, which is interpreted as increasing the sector angle.

Figure 5:
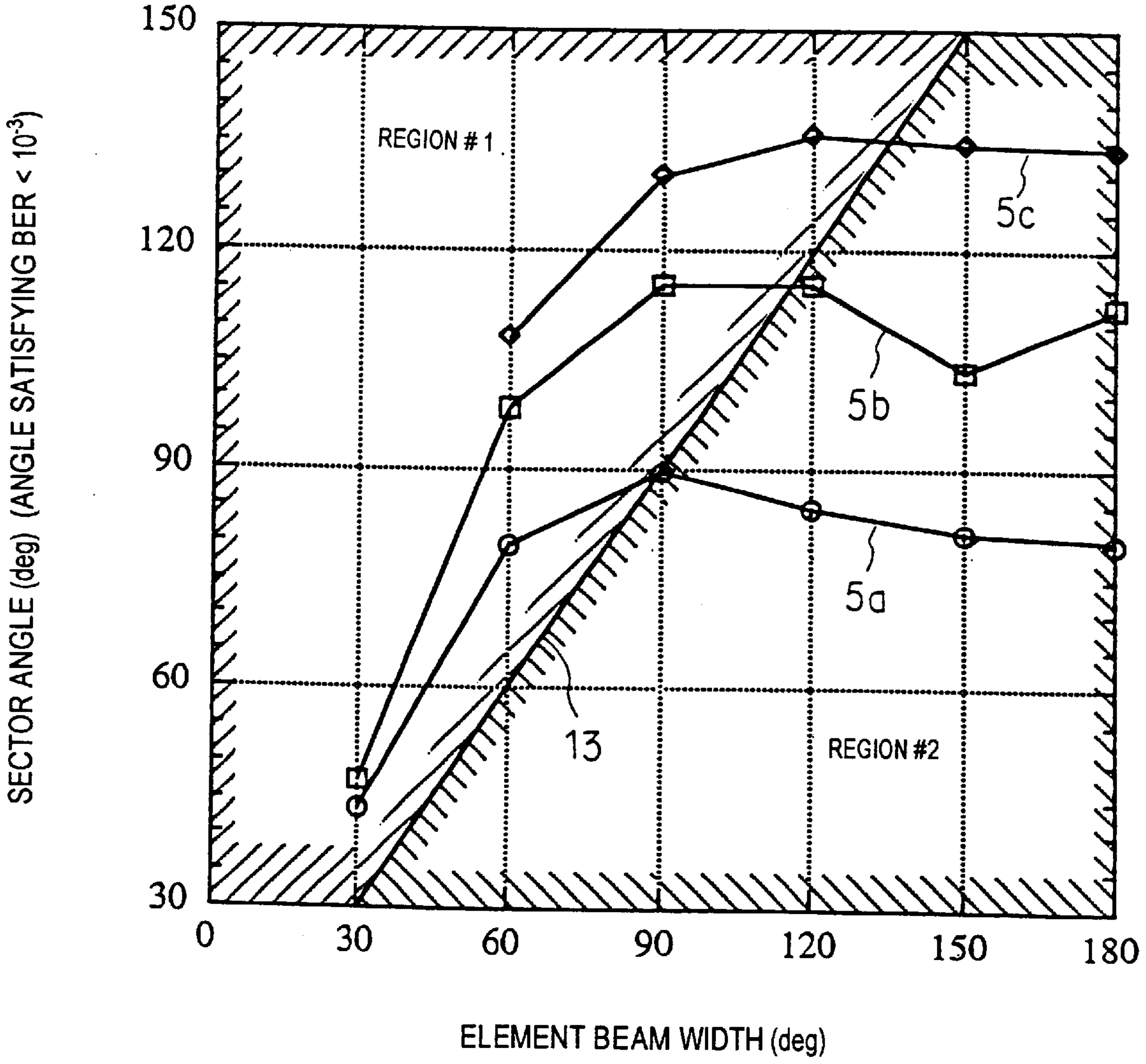
FIG. 5 is a diagram showing a relationship between the element beam width, the sector angle, and the number of array elements.

A summary of these considerations is graphically shown in FIG. 5 where the abscissa represents the element beam width while the ordinate represents an angle (sector angle) within which the error rate is equal to or less than $10^{-3}$, with individual curves 5*a*, 5*b* and 5*c* representing characteristics when the number of array elements is changed to 4, 6 and 8, respectively. A rectilinear line 13 represents a line where a coincidence is reached between element beam width and the sector angle. For example, it will be seen that the number of array elements required when the element beam width is 90° and the sector angle is 90° is equal to 4 while the number of array elements when the element beam width is 120° and the sector angle is 120° is substantially equal to 6. When an element beam width of 120° is chosen, the number of array elements required to achieve the sector angle of the same value 120° is substantially equal to 6, and when the number of array element is increased above this value, for example, to 8, the sector angle will be substantially equal to 135° or becomes greater than the element beam width of 120°. Conversely, when the number of array elements is reduced from 6 to 4, the sector angle will be substantially equal to 85°, which is less than the element beam width of 120°.

These illustrations indicate that (1) if the element beam width is less than the sector angle, a service area which is broader than the beam width can be obtained by increasing the number of array elements (as indicated in region #1 in this Figure), and that (2) when an element beam width greater than the sector angle is employed, the number of array elements per sector can be reduced (as in region #2).

Figure 6:
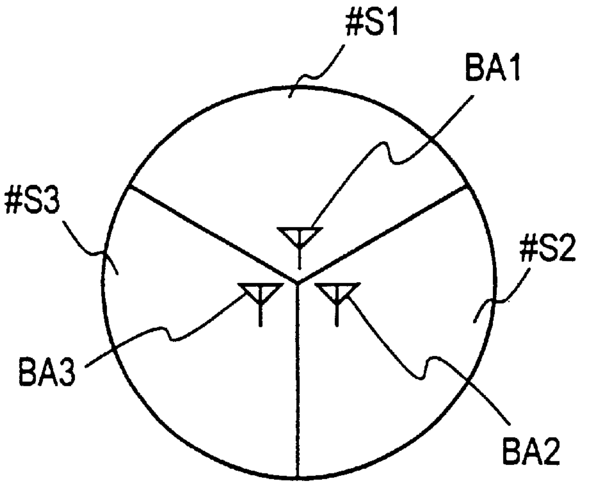
FIG. 6 is a schematic view showing a sector arrangement according to a first embodiment of the invention.
Figure 7:
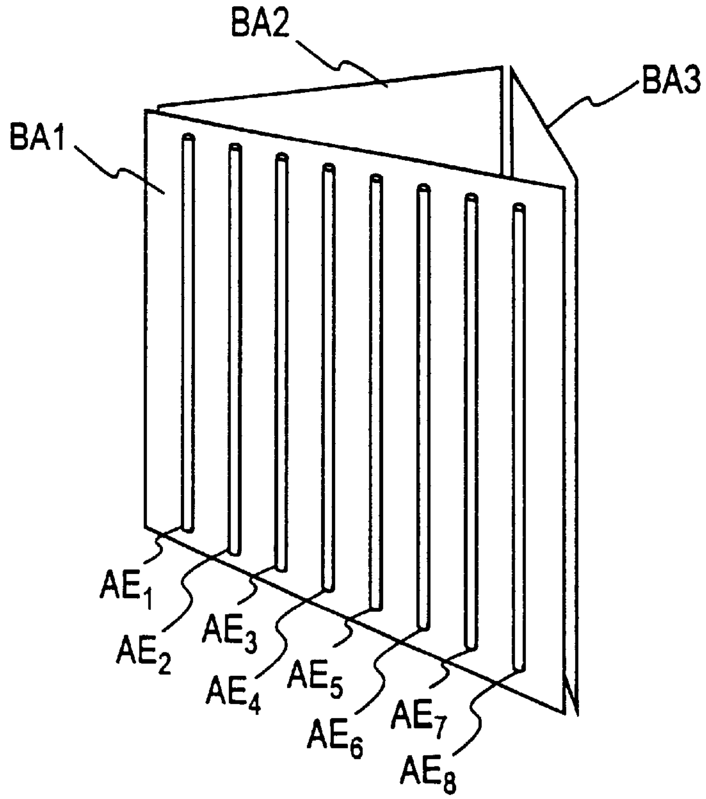
FIG. 7 is a schematic view showing an array antenna arrangement according to the first embodiment of the invention.

In accordance with the outcome of above investigations, a first embodiment of the invention is illustrated in FIGS. 6 and 7. FIG. 6 is a schematic view showing a sector arrangement in which a single cell is divided into three 120°-sectors (sector #S1, #S2, #S3), with a base station antenna unit which incorporates an adaptive array antenna being disposed in each sector. FIG. 7 shows the arrangement of a base station antenna unit for three sectors. Antenna units BA1, BA2 and BA3 for the respective sectors each comprise an 8-element array antenna formed by 8 antenna elements $AE_1$~$AE_8$ disposed in an array as spaced from a reflecting plate 21. Each of the antenna elements $AE_1$~$AE_8$ is a directional antenna. The antenna element has a beam width within the horizontal plane equal to 90° which is narrower than the sector angle. Such beam width can be set up as desired by adjusting the spacing between the antenna elements $AE_1$~$AE_8$ and the reflecting plate 21. The arrangement of FIG. 7 corresponds to the region #1 shown in.

Figure 8:
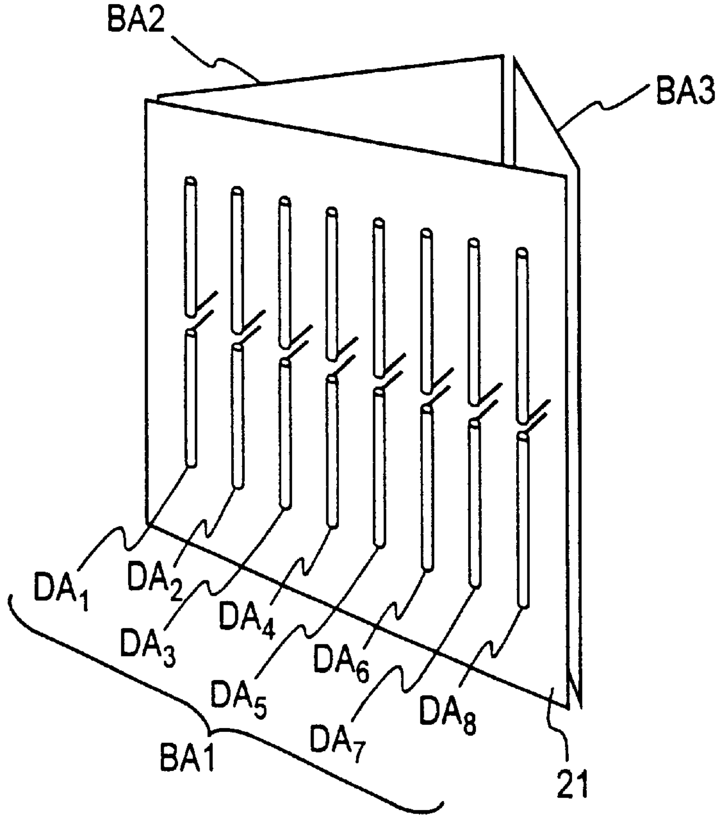
FIG. 8 illustrates the use of dipole antennas as antenna elements in the first embodiment.

FIG. 8 shows the arrangement of an array antenna where half wavelengths dipoles associated with a reflecting plate are used as antenna elements. Each of antenna units BA1, BA2 and BA3 for the respective sectors comprises a reflecting metal plate 21, and dipole antennas $DA_1$~$DA_8$ disposed in front of the reflecting plate 21. The distance between the surface of the reflecting plate 21 and the dipole antennas $DA_1$~$DA_8$ is one-quarter the wavelength λ used, for example. In this instance, the beam width in the horizontal plane of each antenna element is equal to about 120°. If the distance between the dipole antenna elements and the surface of the reflecting plane 21 is reduced, the beam width will be reduced. Conversely, if the spacing is increased, the beam width will increase.

Figure 9:
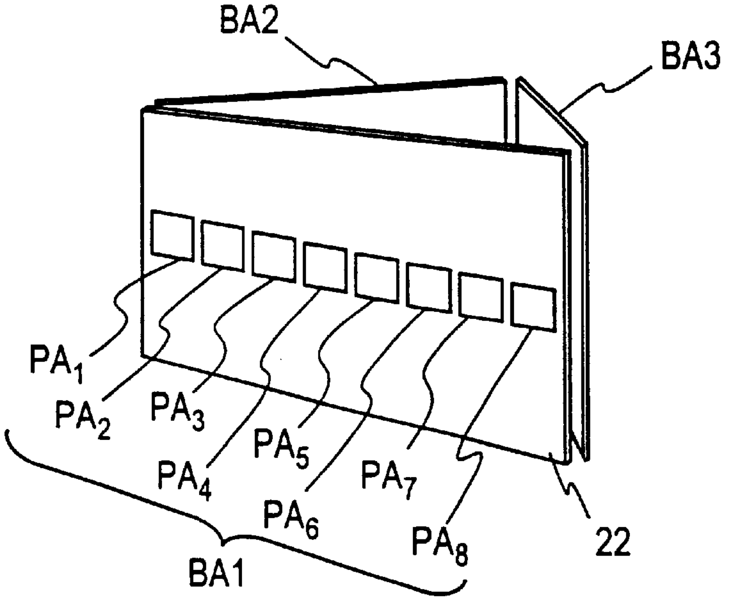
FIG. 9 illustrates the use of patch antennas as antenna elements in the first embodiment.

FIG. 9 shows the arrangement of an array antenna in which patch antennas (micro-strip antennas) are used as antenna elements. The antenna comprises a dielectric substrate 22 with a metal sheet applied to its back surface, and quadrilateral metal patch antennas $PA_1$~$PA_8$ disposed on the front surface of the substrate as spaced from each other. When one side of the patch antenna measures approximately one-quarter wavelength (or more exactly $\lambda/4\in$ where $\in$ denotes the dielectric constant of the dielectric substrate 22), the beam width in the horizontal plane will be about 90°.

In addition, horn antennas may be used as antenna elements, and a desired beam width can be obtained by choosing an opening angle of the horn antenna.

In this manner, if the beam width of each of elements which constitute together an adaptive array antenna is narrower than the sector angle, a service area having a sector angle greater than the beam width can be obtained by increasing the number of array elements.

Embodiment 2

Figure 10:
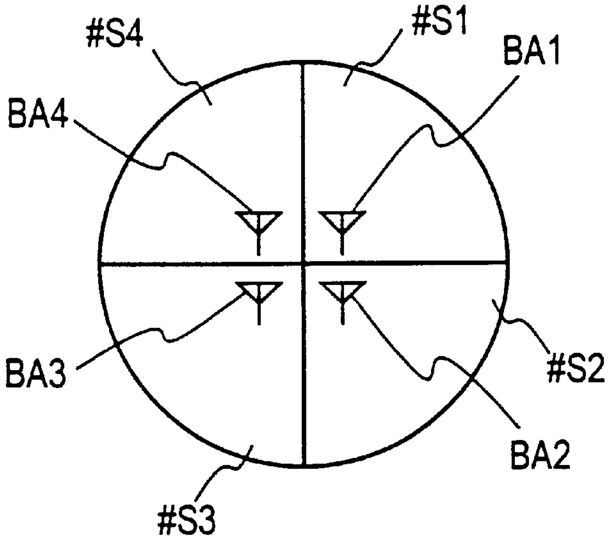
FIG. 10 is a schematic view showing a sector arrangement according to a second embodiment of the invention.
Figure 11:
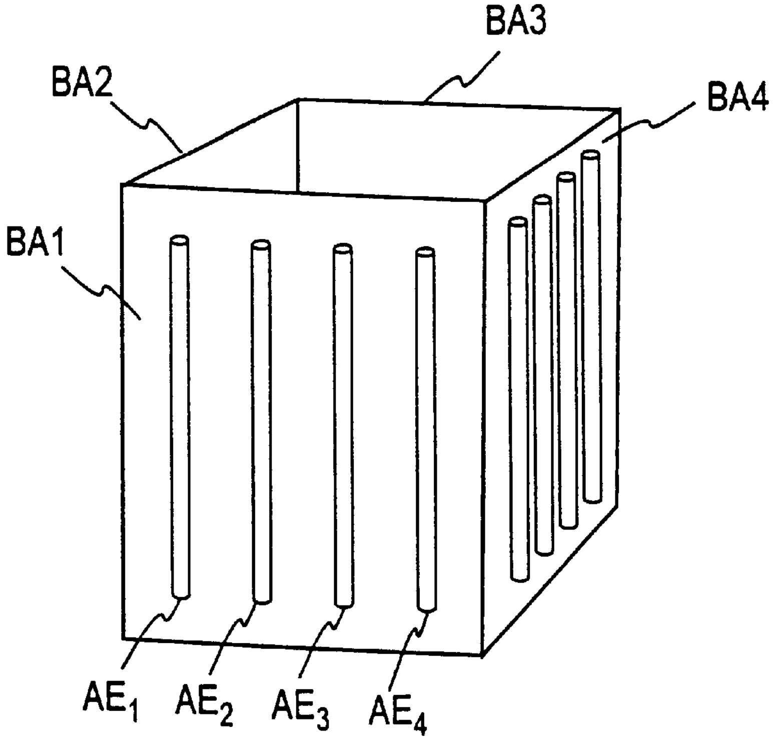
FIG. 11 is a schematic view showing an array antenna arrangement according to the second embodiment of the invention.

FIGS. 10 and 11 show a second embodiment of the invention. FIG. 10 is a schematic view showing the sector arrangement where a single cell is divided into four 90°-sectors (sector #S1, #S2, #S3 and #S4), with a base station antenna unit incorporating an adaptive array antenna being disposed in each sector. FIG. 11 shows the arrangement of a base station antenna unit. An antenna unit for one sector is a 4-element array antenna formed by four antenna elements $AE_1$~$AE_4$, with each antenna element being a directional antenna. The antenna element has a beam width equal to 120° which is greater than the sector angle. This arrangement corresponds to the region #2 shown in FIG. 5.

In this manner, if the beam width of each of elements which constitute an adaptive array antenna has a broader angle than the sector angle, the number of array elements can be reduced even though the sector angle which defines the service area will be narrower than the beam width. Also in this embodiment, the antenna elements may be dipole antennas in the similar manner as shown in FIG. 8 or patch antennas in the similar manner as shown in FIG. 9.

Effects of the Invention

As described above, in accordance with the invention, if the beam width of each of antenna elements which constitute an adaptive array antenna is narrower than a sector angle, a broader service area can be achieved by increasing the number of array elements. Conversely, when antenna elements each having a beam width broader than a sector angle is used as the element antennas, the number of array elements can be reduced than the number of elements which would be required when using antenna elements each having the element beam width equal to the sector angle. As a consequence of these, it is possible to design an optimum antenna arrangement for a desired sector arrangement in the base station adaptive array antenna for CDMA mobile communication.

What is claimed is:

1. An adaptive array antenna unit provided in a base station for a sector of a cell in the CDMA mobile communication system, for adaptively controlling an antenna directivity responses to form a null so as to suppress interference waves and a beam to receive a desired wave, comprising:

antenna elements, which are relatively fixed to one another to constitute a single adaptive array antenna unit, each of said antenna elements having a beam width of directivity in the horizontal plane broader than the width of the service sector area wherein the number of antenna elements needed to cover said service sector area can thereby be reduced.

2. An adaptive array antenna unit according to claim 1 in which the number of antenna elements is smaller than the number of antenna elements which is required when a beam width of directivity of the antenna element is substantially equal to the width of the service sector area.

3. An adaptive array antenna unit provided in a base station for a sector of a cell in the CDMA mobile communication system, for adaptively controlling an antenna directivity response to form nulls so as to suppress interference waves and a narrow beam to receive a desired wave, comprising:

a plurality of antenna elements, which are relatively fixed to one another to constitute a single adaptive array antenna unit, each of said antenna elements having a beam width of directivity in the horizontal plane narrower than the width of the service sector area whereby a plurality of said antenna elements are provided to cover said service sector area.

4. An adaptive array antenna unit according to claim 3 in which the number of antenna elements is greater than the number of antenna elements which is required when a beam width of directivity of the antenna element is substantially equal to the width of the service sector area.

5. An adaptive array antenna unit according to one of claim 3, 4, 1 or 2 in which the adaptive array antenna unit comprises a reflecting plate disposed in a manner corresponding to each sector, and antenna elements disposed in a manner corresponding to each sector, and antenna elements disposed at a spacing from the reflecting plate and disposed in an array as spaced from each other.

6. An adaptive array antenna unit according to claim 5 in which each of the antenna elements comprises a half wavelength dipole antenna.

7. An adaptive array antenna unit according to one of claim 3, 4, 1, or 2 in which the adaptive array antenna unit comprises a dielectric substrate disposed in a manner corresponding to each sector and having a metal sheet applied to the back surface of the substrate and quadrilateal metal patches disposed as spaced from each other on the front surface of the dielectric substrate and measuring $\lambda/2$ on a side.

* * * * *